May 21, 1935.  E. H. FAHRNEY  2,002,367
HYDRAULIC CLUTCH
Filed March 20, 1933   2 Sheets-Sheet 2

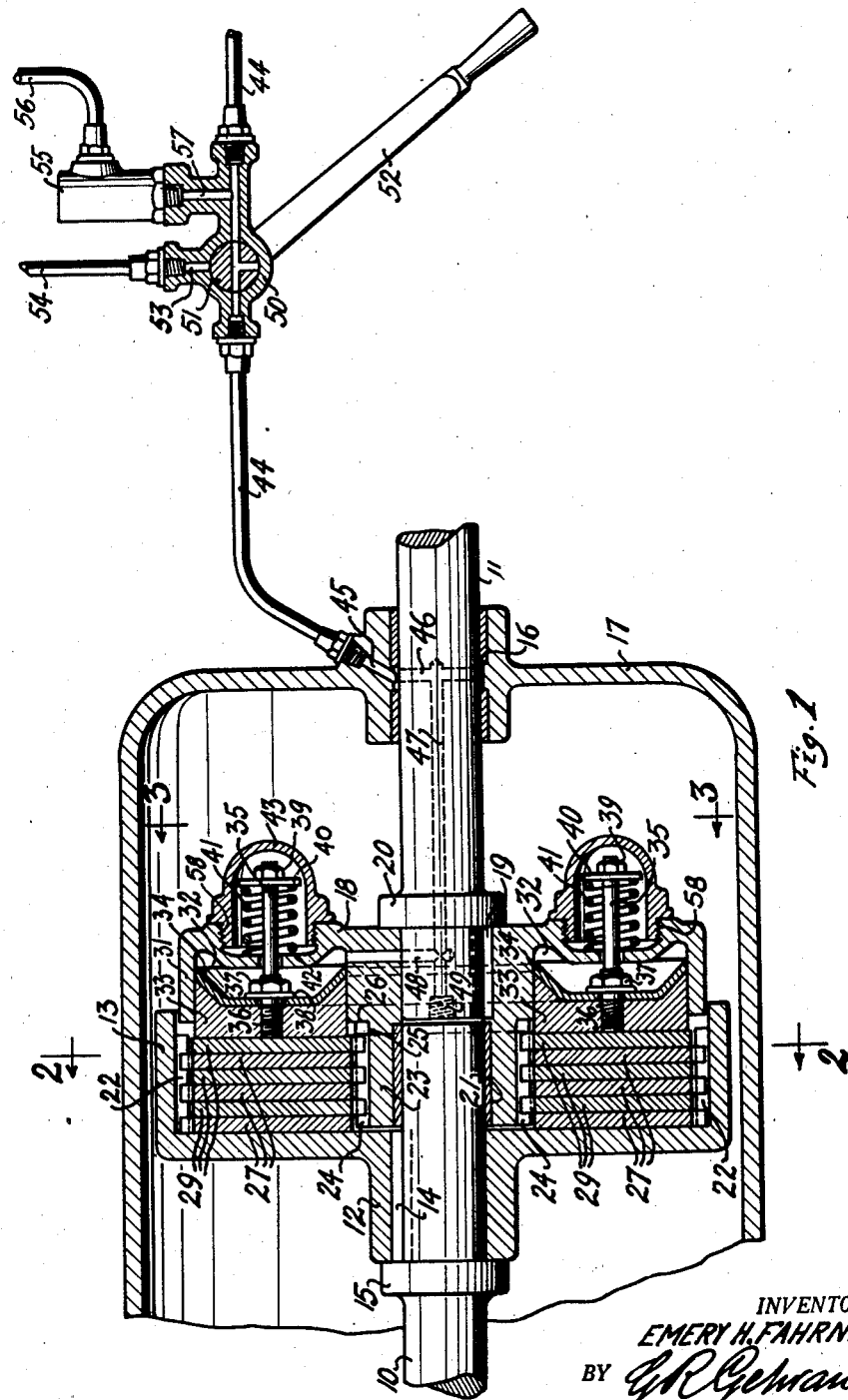

INVENTOR.
EMERY H. FAHRNEY
BY
ATTORNEY

Patented May 21, 1935

2,002,367

UNITED STATES PATENT OFFICE 2,002,367

HYDRAULIC CLUTCH

Emery H. Fahrney, Oak Park, Ill.

Application March 20, 1933, Serial No. 661,723

3 Claims. (Cl. 192—85)

This invention relates to improvements in hydraulic clutch, particularly adapted though not necessarily limited in its use, for connecting a driving and driven shaft, and one of the objects of the invention is to provide a clutch of this character embodying two series of friction creating discs or surfaces, the discs of one series being connected to one of the elements and alternately arranged with respect to the other series of discs, which latter are connected with the other of the elements, and improved means whereby fluid may be circulated under pressure against a plunger for forcing the lateral faces of the discs into and for maintaining them in contact to lock the driving and driven elements for rotation in unison.

A further object is to provide improved means for controlling the circulation of the pressure creating medium and the releasing of the discs with relation to each other.

A further object is to provide improved means for locking or securing the discs with relation to the respective driving and driven elements.

To the attainment of these ends and the accomplishment of other new and useful objects as will appear, the invention consists in the features of novelty in substantially the construction, combination and arrangement of the several parts, hereinafter more fully described and claimed and shown in the accompanying drawings illustrating this invention, and in which Figure 1 is a longitudinal sectional view, with parts omitted and parts broken away, of a clutch of this character constructed in accordance with the principles of this invention.

Figure 3:
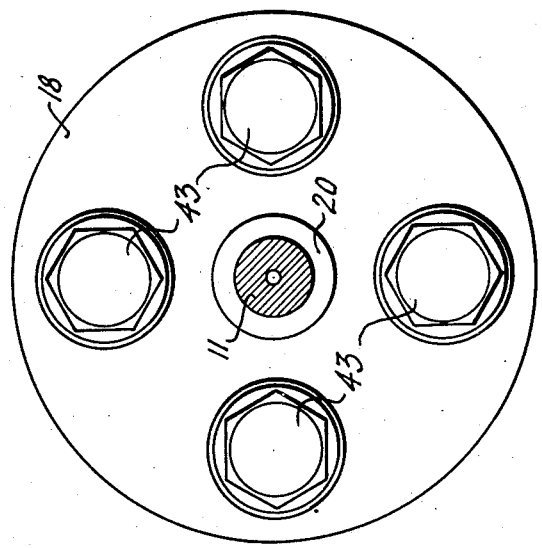
Figure 3 is a detail sectional view taken on line 3—3 Figure 1, with parts omitted.
Figure 2:
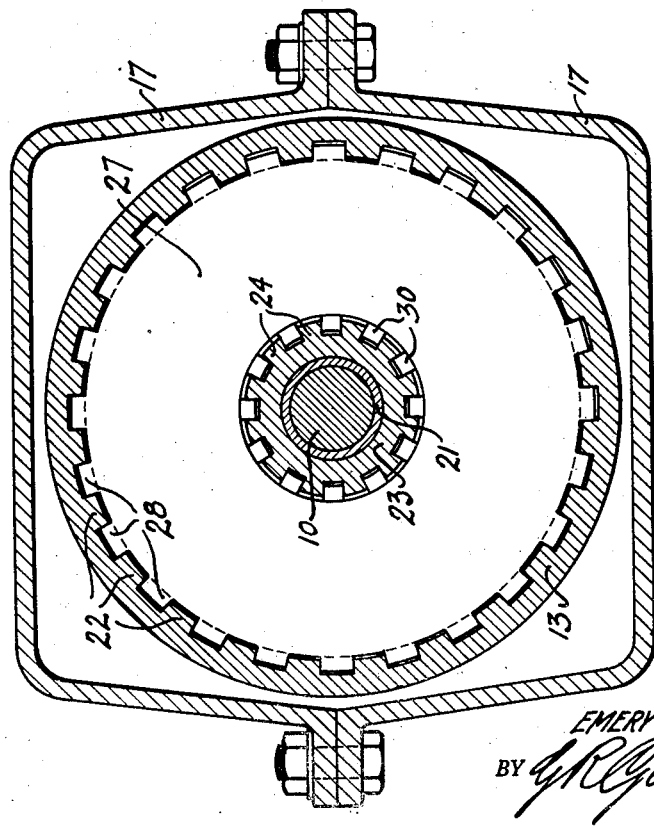
Figure 2 is a detail sectional view taken on line 2—2, Figure 1, with parts omitted.

Referring more particularly to the drawings, the numeral 10 designates a driving shaft and 11 a driven shaft, which are to be connected for rotation in unison.

Mounted upon the driving shaft for rotation therewith is a housing 12 provided with a circumferential flange 13 and having an open side. This housing may be keyed to the shaft 10 if desired, as at 14, and a collar or shoulder 15 may be provided against which the housing abuts to assist in preventing a movement of the housing longitudinally upon the shaft 10.

The driven shaft 11 is journaled in a suitable bearing 16 in the wall 17 of an enclosing casing in which the housing 12 is arranged. Mounted upon the driven shaft 11 for rotation therewith is a head 18 which is secured to the shaft 11 for rotation therewith in any suitable manner such as by means of a key 19, and a collar or shoulder 20 may be provided on the shaft 11 against which the head 18 abuts so as to prevent longitudinal movement of the head upon the shaft 11. The head is provided with a bearing 21 into which one extremity of the driving shaft 10 projects and the extremities of the driving and driven shafts are preferably located in close proximity to each other.

Within the housing 12 and preferably secured to the inner face of the flange 13 and arranged circumferentially about the flange are a series of ribs 22 suitably spaced, and arranged upon the hub portion 23 of the head 18, and which hub portion projects into the housing 12, are similar ribs or projections 24 suitably spaced from each other circumferentially of the hub. If desired, the hub portion may be reduced as at 25 to form a shoulder 26 so as to assist in maintaining the friction creating elements in position.

The numeral 27 designates a series of friction creating discs or members which are provided with projections 28 arranged circumferentially thereabout, and these projections 28 are adapted to enter the spaces between adjacent ribs 22 on the inner surface of the flange 13 of the housing 12. The discs are annular and encompass the extremity of the driving shaft 10, the inner diameter of the annular discs being slightly greater than the external diameter of the ribs 24 on the hub 23 of the head 18.

The discs 27 are spaced laterally from each other, and alternately arranged with these discs are another series of discs 29 which are annular in configuration and are provided with projections 30 extending from their inner circumference, and these projections 30 extend into the spaces between the ribs 24 on the hub 23. The external diameter of the discs 29 is slightly less than the distance between the outer faces of the ribs 22 on the flange 13 of the housing 12.

With this arrangement it will be manifest that the discs of one series are alternately arranged with respect to the other series, and all of the discs of one series are slidably connected with the flange 13 of the housing 12, while the discs of the other series are slidably connected with the ribs 24 on the hub 23 of the head 18.

The head 18 is provided with a peripheral flange 31 to provide a chamber 32 encompassing the shaft 11, and this chamber is provided with an open side arranged in proximity to the open side of the housing 12. The external diameter of the flanged portion 31 of the head 18 is preferably slightly less than the internal diameter of the flanged portion of the head 18, so that one may telescope a short distance into the other, the open sides of the housing 12 and the chamber 32 being in close proximity to each other.

Arranged within the chamber 32 is an annular piston or plunger 33 which forms a closure for the chamber and a protecting member or plate 34 may be provided upon the plunger 33. The protector 34 may be constructed of any suitable material and is preferably channel shaped, so as to act in the nature of a packing to asist in forming a fluid tight joint between the plunger 33 and the wall of the chamber. A plurality of rods 35, any number of which may be provided, may be connected to the plunger 33 as at 36, preferably by screwing the same thereinto and the extremity of the rods pass through a suitable opening in the member 34 and are held in position preferably by means of a nut 37 contacting with a washer 38. The rods project through suitable openings in the wall of the chamber and are provided at their outer extremity with nuts 39 engaging washers 40. A resilient element, such as a coiled spring 41, encompasses each of the rods 35, one end of the spring resting against the washer 40 and the other end resting against the outer face of the wall 42 of the chamber 32.

Suitable caps 43 may be provided to enclose the projecting ends of the rods 35 and the springs 41 and these caps may be threaded into suitable openings in the head 18, as at 58, to removably secure them in position.

These springs 41 are provided for the purpose of moving the plungers 33 in a direction to release the frictional contact between the discs 27 and 29 to permit the driving shaft to rotate independently with respect to the driven shaft, or at a desired differential speed.

The numeral 44 designates a supply pipe leading from any suitable source of supply, such as a pump or the like, and this pipe communicates with an opening 45 in the bearing 16 of the shaft 11, the shaft being provided with an opening 46 with which the opening 45 communicates and 47 designates a passage in the shaft 11 communicating with the passage 48, which latter discharges into the chamber 32. The end of the passage 47 may be closed by a suitable closure 49.

Arranged within the pipe 44 is a valve casing 50 having a rotatable two way valve 51 therein. This valve is controlled by a handle 52 and leading from the casing 50 is an outlet 53 with which a pipe 54 connects. This pipe 54 may lead to any suitable point of discharge or back to the sump of the pump, if this clutch is used in connection with an engine.

The numeral 55 designates a suitable relief valve set for a predetermined pressure and having a discharge outlet pipe 56 which leads to any suitable point of discharge or back to the pump sump. The relief valve has communication with the pipe 44 by means of a suitable passage 57.

In operation, the springs 41 tend normally to move the plunger 33 in a direction that there will be a free sliding contact between the discs 27 and 29, so that the driving shaft may rotate independently with respect to the driven shaft.

When it is desired to lock the driving and driven shafts, the valve 51 is operated by means of the handle 52, so as to move the valve to the position shown in Figure 1. This will permit fluid under pressure to flow through the pipe 44, through the opening 45, passage 46, passages 47 and 48, into the chamber 32 to exert its pressure against the plunger 33 and move the same in a direction to force the discs 29—27 into contact with each other, against the stress of the springs 41. The pressure exerted upon the plunger 33 will hold the discs frictionally locked together and thereby lock the driving shaft 10 with the driven shaft 11 for rotation in unison. Any excess pressure upon the fluid in the chamber 32 will be relieved by the relief valve 55.

When it is desired to release the clutch the valve 51 is moved by the handle 52 so as to connect the outlet passage 53 with the portion of the passage 44 which communicates directly with the chamber 32, so that the fluid pressure from the source being relieved from the chamber 32, the springs 41 will overcome such pressure and move the plungers 33 backwardly to release the discs 27—29. The fluid displaced by such movement of such plunger 33 will flow through the pipe 54.

When the supply is cut off by the valve 51 being so positioned, any excess pressure upon the fluid before passing the valve 51 and when the latter is closed, will be relieved through the passage 57 and relief valve 55.

While the preferred form of the invention has been herein shown and described, it is to be understood that various changes may be made in the details of construction and in the combination and arrangement of the several parts, within the scope of the claims, without departing from the spirit of this invention.

What is claimed as new is:

1. An hydraulic clutch comprising a driving and a driven shaft, a housing secured to each of the shafts and each having an open side, the open sides of the housing being disposed adjacent each other and one telescoping into the other for a short distance, a series of laterally spaced friction discs secured to one of the shafts, a series of friction discs secured to the other shaft and alternately arranged with respect to the first said series, said discs being laterally shiftable, a plunger in one of said housings encompassing the shaft and contacting one of the discs, resilient means normally moving the plunger in a direction to retract the plunger, means for directing a fluid under pressure into one of the housings to act upon the plunger to move it against the stress of the said resilient means to force the discs into frictional engagement, a channel in one face of the plunger and encompassing the shaft in said chamber, and a packing fitting in said channel and contacting the wall of the housing.

2. An hydraulic clutch comprising a driving and a driven shaft, a housing secured to each of the shafts and each having an open side, the open sides of the housing being disposed adjacent each other and one telescoping into the other for a short distance, a series of laterally spaced friction discs secured to one of the shafts, a series of friction discs secured to the other shaft and alternately arranged with respect to the first said series, said discs being laterally shiftable, a plunger in one of said housings, a plurality of rods connected with the plunger and extending through the wall of the housing, springs encompassing the rods outside of the housing and tending normally to retract the plunger, and means for introducing a fluid into the housing to act upon the plunger to move the latter against the stress of the said springs.

3. An hydraulic clutch comprising a driving and a driven shaft, a housing secured to each of the shafts and each having an open side, the open sides of the housing being disposed adjacent each other and one telescoping into the other for a short distance, a series of laterally spaced friction discs secured to one of the shafts, a series of friction discs secured to the other shaft and alternately arranged with respect to the first said series, said discs being laterally shiftable, a plunger in one of said housings, a plurality of rods connected with the plunger and extending through the wall of the housing, springs encompassing the rods outside of the housing and tending normally to retract the plunger, means for introducing a fluid into the housing to act upon the plunger to move the latter against the stress of the said springs, and a protecting casing individual to the rods and springs and secured to the outside of the casing to house the projecting portions of the rods and the springs.

EMERY H. FAHRNEY.